Nov. 13, 1962 A. WINKLER 3,063,336
EXPOSURE METER
Filed Sept. 23, 1959 2 Sheets-Sheet 1

INVENTOR.
ALFRED WINKLER
BY Michael S. Striker
Attorney

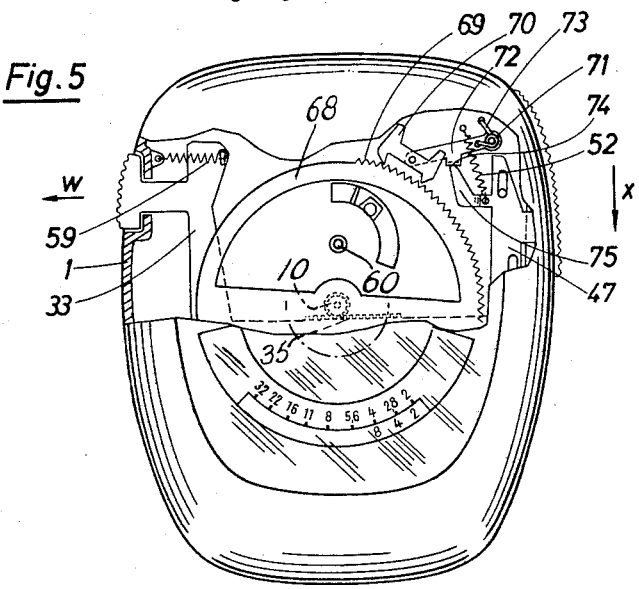

United States Patent Office 3,063,336
Patented Nov. 13, 1962

3,063,336
EXPOSURE METER
Alfred Winkler, Munich, Germany, assignor to Agfa A.G., Leverkusen-Bayerwerk, Germany
Filed Sept. 23, 1959, Ser. No. 841,803
Claims priority, application Germany Sept. 26, 1958
6 Claims. (Cl. 88—23)

The present invention relates to exposure meters of the type used to determine the proper settings of the exposure time and exposure aperture of a camera prior to making an exposure.

The present invention deals in particular with that type of exposure meter wherein the position of a follower pointer is determined by the position of a light meter pointer, the follower pointer by its angular position actuating certain structure which indicates any number of proper combinations of exposure time and exposure aperture.

Exposure meters of this latter type are usually provided with a single operating member actuated by the operator for the purpose of tensioning the structure of the exposure meter as well as releasing the structure in order to give a reading, so that during the single manipulation of a single member the exposure meter is first tensioned and then released so as to give the reading. For example, the tensioning takes place during pressing of such an operating member by the operator in one direction, and then the operator releases the operating member so that it can return to its first position, and upon release of such an operating member the tensioned structure of the exposure meter is released in order to give the desired reading.

This conventional structure gives rise to serious faults. Thus, the tensioning of the parts requires a considerable force to be exerted by the operator, and as a result there is in many cases unsteadiness on the part of the operator, this unsteadiness giving rise to inaccuracies. Furthermore, it is possible for the operator to release the operating member immediately after it has been moved to its end position, and in such an operation, the immediate release of the operating member causes the light meter pointer to be stopped in a position which is not necessarily the position which accurately indicates the lighting conditions since the structure will in this case operate so rapidly that the reading is taken before sufficient time has elapsed to enable the light meter pointer to reach a position accurately indicating the lighting conditions. Therefore, the possibility of immediate release by the operator of the single operating member also gives rise to inaccuracies. There are also other defects in exposure meters of the above type. For example, when the follower pointer strikes against the relatively light light meter pointer, the latter can be easily bent, so that the light meter pointer does not retain its original configuration. Also, with certain types of exposure meters all the parts return to a zero position so that if the operator forgets the values given by the exposure meter it is necessary to go through the entire operation a second time.

One of the objects of the present invention is to provide an exposure meter which not produce any unsteadiness resulting from operation of a simple member for the purpose of tensioning and releasing the structure.

Another object of the present invention is to provide an exposure meter wherein the light meter pointer will of necessity have sufficient time to reach a position accurately indicating the lighting conditions before a reading is taken from the exposure meter.

Also, it is an object of the invention to provide an exposure meter wherein the delicate light meter pointer will be reliably held in a very secure manner prior to striking of the follower pointer against the light meter pointer.

Also, it is an object of the invention to provide an exposure meter wherein the reading last taken from the exposure meter remains thereon until the exposure meter is actuated to give a reading for another exposure, so that in case the operator forgets the last reading he need only glance at the exposure meter and need not operate the exposure meter again.

It is an additional object of the present invention to provide an exposure meter which will operate very reliably while eliminating any possibility of errors and which at the same time requires practically no special precautions on the part of the operator.

With the above objects in view, the present invention includes in an exposure meter a manually operable tensioning means movable by the operator from a rest position to an operating position for tensioning the parts of the exposure meter preparatory to taking a reading therefrom. A manually operable release means cooperates with the tensioning means to retain this tensioning means in the operating position to which it has been moved by the operator until the manually operable release means is actuated by the operator to release the tensioning means in order to obtain a reading from the exposure meter. Thus, it will be seen that with the structure of the invention there are at least two independent separate manually operable means required to be actuated by the operator in order to obtain a reading from the exposure meter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a longitudinal sectional view taken along line III—III of FIG. 2 in the direction of the arrows;

FIG. 4 is a transverse sectional view taken along line IV—IV of FIG. 3 in the direction of the arrows; and FIG. 5 is a plan view, with parts broken away to illustrate structure therebeneath, of a somewhat different embodiment of an exposure meter according to the present invention.

Figure 1:
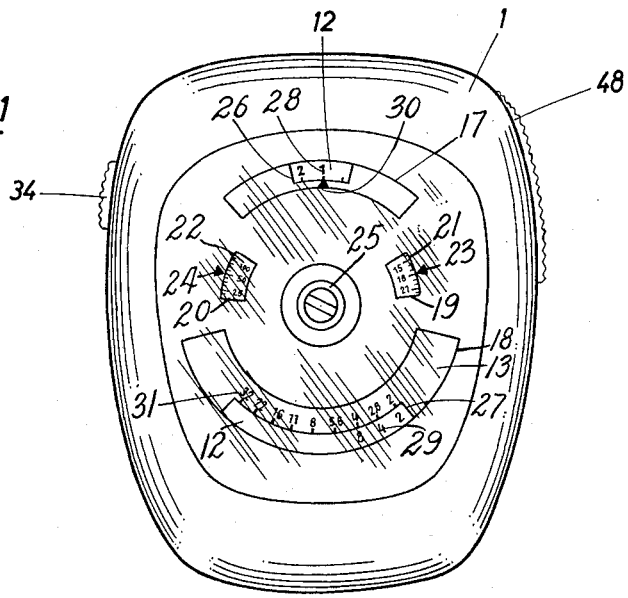
FIG. 1 is a top plan view of the exposure meter of the invention illustrating the meter as it appears to the operator during use of the exposure meter.

Referring to the drawings, it will be seen that the exposure meter of the invention is provided with a housing which includes an upper housing part 1 and a lower housing part 2 interconnected in any suitable way with the upper housing part 1. These housing parts 1 and 2 carry in a known way a photoelectric cell 3 (FIG. 3) which receives light passing through the honeycomb lens 4. A measuring instrument such as a galvanometer 5 is carried within the housing by the lower housing part 2, this galvanometer 5 measuring in a known way the electrical energy of the photocell induced by light impinging on the latter so that in this way the amount of light is measured by the instrument 5, and this instrument 5 includes a rotor coil 6 which turns to an angular position determined by the amount of light received by the photocell. A pointer 7 is fixed to the rotor 6 to turn with the latter, and as is particularly apparent from FIG. 3, the pointer 7 has a free end portion 7a which extends parallel to the axis of the rotor 6.

The lower housing part 2 fixedly carries a support plate 8 which in turn fixedly carries a pin 9 which serves to pivotally support various parts of the exposure meter. Thus, a pinion 10 is pivotally supported by the pin 9 and coaxially fixed to the pinion 10 is a tensioning disc 11. The pin 9 supports for turning movement over the disc 11 and completely independent of the latter an indicator disc 12 as well as an auxiliary indicator disc 13 located over the disc 12, these discs 11, 12 and 13 all being freely turnable with respect to each other on the pin 9. The pin 9 has, as shown most clearly in FIG. 3, an upper free end which supports a hollow sleeve 14 which is fixed to the disc 13, this sleeve 14 having a top closed end and extending through an aperture formed in the transparent cover disc 15 which is fixedly carried by the upper housing part 1, so that the sleeve 14 extends through the exterior of the housing at the exterior face of the transparent cover disc 15. The inner surface of the disc 15 is partially covered with an opaque coating 16, this coating 16 being located at all parts of the inner surface of the disc 15 except the portions 17, 18, 19 and 20 so as to provide windows 17–20 which are shown most clearly in FIG. 1. In the windows 19 and 20 a pair of scales 21 and 22 of the auxiliary indicator disc 13 are visible, and these scales cooperate with the indexes 23 and 24 which are located on the cover disc 15 in the manner indicated in FIG. 1. In order to render the disc 13 convenient to adjust, the sleeve 14 has at the exterior of the cover disc 15 a relatively wide annular flange 25 which has an exterior knurled surface, this flange 25 being visible in FIGS. 3 and 4. Thus, it is simple for the operator to turn the sleeve 14 on the top end of the stationary pin 9, and with the turning of the sleeve 14 the angular position of the indicator disc 13 will be adjusted. In the region of the windows 17 and 18 the indicator disc 13 is formed with cutouts 26 and 27, respectively, visible in FIG. 1, and these cutouts 26 and 27 render a light value scale 28 and an exposure time scale 29 of the indicator disc 12 visible from the exterior of the exposure meter, as is indicated in FIG. 1. The disc 13 is provided at the edge of the cutout 26 with an index 30 cooperating with the scale 28, and the disc 13 is provided along the edge of the cutout 27 with an aperture scale 31 which cooperates with the exposure time scale 29 to indicate various possible combinations of exposure time and exposure aperture.

Figure 2:
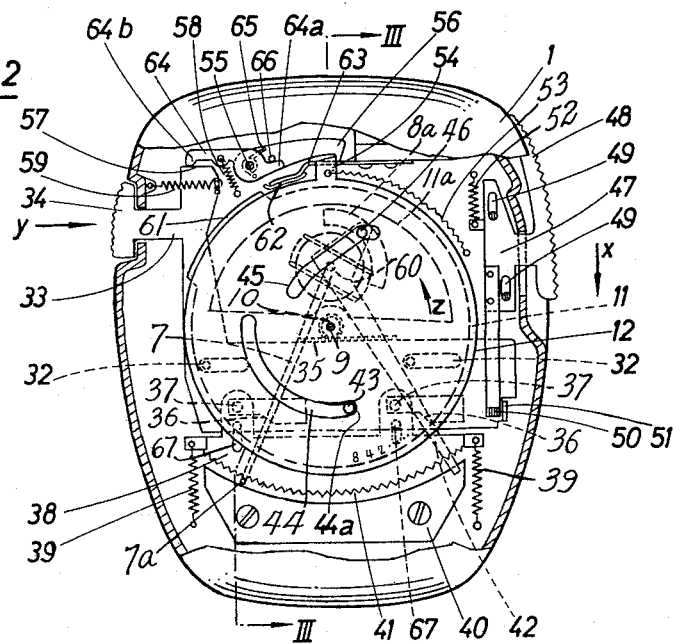
FIG. 2 is a top plan view of the exposure meter with the upper exterior structure removed so as to indicate the mechanism in the interior of the exposure meter of the invention.

The exposure meter of the invention includes a tensioning means for tensioning the parts of the exposure meter preparatory to taking a reading therefrom, and this tensioning means includes in addition to the tensioning disc 11 and the pinion 10 fixed coaxially thereto, a tensioning plate 33 formed with slots extending horizontally, as viewed in FIG. 2, and through which respectively extend pins 32 which are fixed to the plate 8, so that in this way the tensioning plate 33 is guided by the pin-and-slot connection for horizontal shifting movement to the right and left, as viewed in FIG. 2. As is apparent from FIG. 2 a spring 59 is fixed at its left end to the housing and at its right end to the plate 33 to urge the latter to the left to its rest position. The housing part 1 to which the spring 59 is connected is formed with an opening through which a portion of the plate 33 extends into engagement with a handle or actuating knob 34 which is fixed to the plate 33 so that the operator has access to element 34 for manually actuating the tensioning means. The plate 33 is provided with rack teeth 35 which mesh with the pinion 10. In addition, the plate 33 is formed with cutouts providing the plate 33 with the camming edges 36 shown most clearly in FIG. 2, these camming edges 36 cooperating with a gripping means which is capable of being actuated to release the pointer 7 of the light meter as well as to grip the latter. Thus, the camming edges 36 cooperate with an engage pins 37 which extend upwardly through the openings of the plate 33 which are provided with the camming edges 36, and these pins 37 are fixed to a movable jaw means 38 of the gripping means of the invention. This jaw means 38 is acted upon by a spring means 39 to be urged into its gripping position. Thus, as is shown in FIG. 2, the springs 39 are fixed at one end to the housing and at their opposite end to the jaw means 38 to pull the latter toward the stationary jaw means 40 of the gripping means, the jaw means 38 forming the movable jaw means of this gripping means. The jaw means 38 is formed with a pair of slots 67 cooperating with pins extending downwardly from the plate 8, so that in this way the jaw means 38 is guided by this pin-and-slot arrangement for movement toward and away from the stationary jaw means 40. The movable jaw means 38 is guided for movement back and forth and is carried by the lower housing part 2. The jaw means 38 is composed of a pair of jaws 38a and 38b located one above the other and spaced from and parallel to each other, the pair of jaws 38a and 38b being fixed to each other for movement as a unit, and these jaws are fixed to each other at their outer side edges, so that they define between themselves an elongated free space, and the stationary jaw means 40 is also in the form of a pair of jaws 40a and 40b located one above the other and also spaced from and parallel to each other and being interconnected at their outer ends, so that the pair of jaws 40a and 40b also form an elongated free space between themselves. It will be noted that the free end portion 7a of the pointer 7 extends upwardly through the gap between the upper and lower plates of both of the jaw means. The stationary jaw means 40 is fixedly carried by the housing of the exposure meter. The stationary and movable jaw means define between themselves an arcuate gap 41 through which the free end 7a of the pointer 7 extends.

The exposure meter includes a follower pointer 42 which extends across the gap 41 in a direction perpendicular to the free end portion 7a of the pointer 7, and this follower pointer 42 extends through the space defined between the pair of jaw plates 38a and 38b as well as into the space defined between the pair of jaw plates 40a and 40b. A pivot pin 60 is fixedly carried and extends downwardly from the plate 8, and this pivot pin 60 turnably supports the follower pointer 42, the turning axis of the follower pointer 42 being coincident with the turning axis of the pointer 7. It will be noted, however, that the turning axis of the pointer 42 as well as the pointer 7 is displaced with respect to the axis of the pin 9.

The above-described tensioning means constituted by the plate 33, the pinion 10, and the disc 11 is inter-connected with the indicator disc 12 through a one-way transmission means which will transmit movement of the tensioning means to the disc 12 when the knob 34 is moved by the operator in the direction of the arrow y shown in FIG. 2, while there will be no transmission of motion during the return of the tensioning means to its rest position. This transmission means is constituted by a pin 43 fixed to and extending upwardly from the plate 11 and extending into an arcuate slot 44 formed in the indicator disc 12. As is shown in FIG. 2, the slot 44 extends along a circle whose center is in the axis of the pin 9. When the knob 34 is moved to the right, in the direction of the arrow y of FIG. 2, the pin 43 will engage in the end 44a of the slot 44 so as to turn the disc 12 in a counterclockwise direction, as viewed in FIG. 2, to a given tensioned position, and the length of the slot 44 is sufficient to enable the pin 43 to return along the slot 44 without engaging the end thereof opposite from the end 44a during return of the plate 33 to its rest position while the plate or disc 12 remains in the angular position to which it was moved during actuation of the tensioning structure in the direction of the arrow y.

As may be seen from FIG. 2, the indicator disc 12 is also formed with an elongated slot 45 having the configuration illustrated in FIG. 2. The follower pointer 42 has the construction of a bell crank, one arm of which extends radially from the axis of the pin 60 through the space between the plates of the movable jaw means 38 into the space between the plates of the stationary jaw means 40 of the gripping means, as described above, and the other arm of which extends upwardly to the right, as viewed in FIG. 2, this other arm fixedly carrying a pin 46 which extends into the elongated slot 45. This pin 46 extends through the substantially semi-circular cutout 11a of the tensioning disc 11 as well as through the arcuate elongated cutout 8a of the plate 8, as is apparent from FIGS. 2 and 3. The pointer 7 when moving from light value to light value does not move through the same angular distances, as is well known, and therefore the follower pointer 42 in following the pointer 7 also will not move through the same angular distances from one light value to the next. The curvature of the slot 45 is such that the turning of the indicator disc 12 will compensate for the different angular distances through which the pointers turn from one light value to the next in such a way that the plate 12 will actually turn through equal angular distances from one light value to the next light value, and thus the graduations of the scale 28 of the disc 12 can be located at equal angular distances from each other and give accurate light value readings as a result of the transmission between the pointer 42 and the disc 12 provided by the pin 46 in cooperation with the slot 45.

When the above-described tensioning means is actuated by the operator so as to tension the exposure meter preparatory to taking a reading therefrom, this tensioning means is moved from its rest position to an operating position, and a manually operable retaining means is provided for retaining the tensioning means in its operating position until this retaining means is actuated by the operator to release the tensioning means for return movement by the spring 59 to its rest position. This manually operable retaining means includes a plate 47 which is moved by the operator in the direction of the arrow $x$ shown at the right of FIG. 2 in order to release the tensioning means. Of course, upon release of the tensioning means the exposure meter will operate to give a reading from which the proper combination of exposure time and exposure aperture will be derived. The plate 47 extends through a cutout in the housing into connection with an elongated knob 48 which is accessible to the operator for actuating the release means. Furthermore, the plate 47 is provided with elongated slots 49 through which extend pins fixed to the upper housing part 1, so that through this pin-and-slot connection the release plate 47 is guided for substantially vertical movement, as viewed in FIG. 2. The plate 47 fixedly carries at its lower end, as viewed in FIG. 2, a catch 50 located at the end of a springy plate fixed to the plate 47, and the catch 50 is provided at its underside, as shown at the right of FIG. 4, with an inclined surface 50a. The tensioning plate 33 is provided at its lower right end, as viewed in FIG. 2, with an upwardly directed catch 51, and during the tensioning movement of the plate 33 to the right, as viewed in FIG. 2, the catch 51 will engage and ridge along the inclined surface 50a, the catch 50 yielding upwardly during this tensioning movement of the plate 33, and as soon as the upwardly directed catch 51 shown in FIG. 4 moves to the right beyond the catch 50, the latter will snap down to the position illustrated in FIG. 4 just to the left of the catch 51 so that in this way when the retaining means 47 is in the position illustrated in FIG. 2 with the catch 50 aligned with the catch 51 the tensioning means will be retained in its operating position illustrated in FIG. 2 until the operator chooses to actuate the release means 47. The plate 47 is yieldably maintained in the rest position thereof illustrated in FIG. 2 by a spring 52 connected at one end to the plate 47 and at its opposite end to a stationary part of the housing, this spring 52 maintaining the lower ends of the slots 49, as viewed in FIG. 2, in engagement with the pins extending therethrough so as to locate the plate 47 in the position illustrated in FIG. 2.

During the turning of the indicator disc 12 in counterclockwise direction, as viewed in FIG. 2, when the operator moves the tensioning means from its rest to its operating position, a spring 53 connected to an extension or projection 54 of the plate 12 is tensioned, this spring 53 being connected at its opposite end to a stationary part of the housing. Thus, the end of the spring 53 distant from the projection 54 of the disc 12 is fixed to a stationary part of the upper housing member 1. A pawl member 56 cooperates with the projection 54 to retain the disc 12 in the position to which it is turned by the tensioning means, and this pawl 56 is turnably carried by a stationary pivot pin 55 fixedly carried by the housing. A control lever 64 is also turnable on the pivot pin 55, and a wire spring 65 is coiled around the pin 55, engages with one end the upper edge of the pawl 56, as viewed in FIG. 2, and with its opposite end is fixed to the lever 64, so that the spring 65 urges the lever 64 in a counterclockwise direction, as viewed in FIG. 2, with respect to the pawl 56. The lever 64 has a projection 64a which engages a pin 66 fixed to the pawl 54 so as to limit the turning of the lever 64 with respect to the pawl 56 by the spring 65. The end of the lever 64 distant from the projection 64a thereof forms a follower 64b which engages a camming edge 57 located along the uppermost part of the tensioning plate 33, as viewed in FIG. 2. It is apparent from FIG. 2 that during the return of the plate 33 to its rest position under the influence of the spring 59, the lever 64 will not turn until the right end of the camming edge 57 moves to the left beyond the follower end 64b of the lever 64. A spring 58 is connected at its lower end, as viewed in FIG. 2, to the housing, and at its upper end, as viewed in FIG. 2, to the lever 64 on the left side of the pivot pin 55 so that the spring 58 urges the lever 64 in a counterclockwise direction, as viewed in FIG. 2, to maintain the follower end 64b of the lever 64 in engagement with the camming edge 57.

The exposure meter of the invention includes a retarding means for retarding the operation of the part of the exposure meter so as to guarantee that the pointer 7 will have sufficient time to assume an angular position which is accurately indicative of the lighting conditions, and in the embodiment which is illustrated in FIG. 2 this retarding means includes an elongated arcuate projection at the periphery of the tensioning disc 11, this projection being provided with a braking peripheral edge 61 which cooperates with a brake shoe 62 carried by a leaf spring 63 which is fixedly carried by a stationary part of the housing.

When using the exposure meter, the operator tensions the parts by moving the knob 34 in the direction of the arrow $y$ of FIG. 2 until the catch 51 of the plate 33 is engaged by the catch 50 so that the parts will be retained in their tensioned position. During this movement of the tensioning plate 33 the rack teeth 35 thereof will turn the pinion 10 and the tensioning disc 11 therewith in a counterclockwise direction, as viewed in FIG. 2, and as shown by the arrow $z$ of FIG. 2, so that the pin 43 by engagement with the end 44a of the slot 44 of the disc 12 will also turn the indicator disc 12 in the direction of the arrow $z$. Of course, during this turning of the disc 12 the spring 53 is tensioned. Moreover, during this shifting of the plate 33 to the right, as viewed in FIG. 2, the camming edges 36 thereof move the pins 37 upwardly, as viewed in FIG. 2, so as to shift the movable jaw means 38 in opposition to the springs 39 away from the stationary jaw means 40 so as to widen the gap 41 and thus free the pin 7 to turn to whichever angular position it assumes in accordance with the light received by the photocell. Moreover, the turning of the disc 12 in the direction of the arrow $z$ of FIG. 2 causes the slot 45 to cooperate with the pin 46 to turn the follower pointer 42 to the end position thereof illustrated in FIG. 2. At the end of the turning of the indicator disc 12 the projection 54 thereof moves behind the tooth of the pawl 56 which is urged by the spring 65 to the position illustrated in FIG. 2 where the pawl 56 engages the projection 54 to retain the indicator disc 12 in the position illustrated in FIG. 2. Moreover, the plate 33 during its movement to the right, as viewed in FIG. 2, will have engaged the follower end 64b of the lever 64 so that this follower end 64b will ride up onto the camming edge 57. Thus, all of these operations take place during movement of the tensioning means from its rest to its operating position, and at the end of this movement the retaining means 47 through its catch 50 retains the tensioning means in its operating position where all of the parts are tensioned and have the positions indicated in FIG. 2.

When it is desired to take a reading from the exposure meter, the operator actuates the release means by moving the plate 47 in the direction of the arrow x of FIG. 2, and this movement moves the catch 50 downwardly beyond the catch 51, as viewed in FIG. 2, so that the tensioning means is released to be returned to its rest position. Thus, under the action of the spring 59, the plate 33 will be urged to the left, as viewed in FIG. 2, once the release means has been actuated by the operator, and this will result in turning of the pinion 10 together with the disc 11 in a clockwise direction, as viewed in FIG. 2. Now the braking edge 61 will move along and engage the brake shoe 62 so that the return of the tensioning means to its rest position is retarded through this braking structure.

Thus, during the return of the tensioning means to its rest position, the tensioning disc 11 turns in a clockwise direction, as viewed in FIG. 2, and the transmission pin 43 simply rides along the slot 44 without transmitting the movement. Also, the camming edge 57 rides along the follower 64b of the lever 64, and also the camming edges 36 ride along the pins 37. When the plate 33 has moved through approximately half the distance toward its rest position, the camming edges 36 will release the pins 37 so that the movable jaw means 38 can be moved by the springs 39 to the gripping position where the movable jaw means approaches the stationary jaw means 40 and with the latter grips the pointer 7 so as to retain this pointer 7 in its angular position. It will be noted that with this structure there has been sufficient time for the pointer 7 to assume an angular position which will accurately be indicative of the lighting conditions.

During the further return movement of the plate 33 to its rest position, the camming edge 57 will move to the left beyond the follower end 64b of the lever 64, as viewed in FIG. 2, and now the spring 58 will turn the lever 64 together with the pawl 56 in a counterclockwise direction around the pivot pin 55, as viewed in FIG. 2, so that the pawl 56 moves away from the projection 54 and now the spring 53 can turn the indicator disc 12 in a clockwise direction. Through the transmission provided by the slot 45 and the pin 46 the indicator disc 12 will turn the follower pointer 42 in a clockwise direction, as viewed in FIG. 2, and this follower pointer will move until it engages the already gripped light meter pointer 7, so that the angular position of the light meter pointer will determine the position of the follower pointer 42 and thus the angular position of the indicator disc 12 will be indicative of the lighting conditions. It will be noted that with the gripping structure of the invention the follower pointer 42 strikes against the free end portion 7a of the light meter pointer at a part of this free end portion 7a which is located between a pair of gripped portions of the light meter pointer, so that the follower pointer 42 cannot in any way injure the light meter pointer. The light value which is thus given by the structure of the invention can be read on the scale 28 in cooperation with the index 30. Furthermore, the exposure times of the scale 29 will cooperate with the aperture values of the scale 31 so that the operator can choose from among the several possible combinations of exposure time and exposure aperture. The scales 21 and 22 give the exposure indexes of various types of films of different speeds, and by turning the knob 25 the operator can set these scales of the upper disc 13 so as to preset the exposure meter for a given film speed. It should be noted that the turning of the disc 13 by the operator will set not only the exposure index of the particular film into the exposure meter, but in addition the index 30 will be positioned with respect to the scale 28 and the scale 31 will be positioned with respect to the scale 29, this positioning of the index 30 and scale 31 being in accordance with the particular film speed which appears on the scales 22 and 21.

A particular feature of the invention resides in the fact that the parts will remain in the position where the pointer 7 is gripped and the follower pointer 42 is located thereagainst, so that the reading given by the exposure meter remains thereon until the exposure meter is again actuated in the above-described manner to obtain another reading, and thus if the operator should forget the reading he need only glance again at the exposure meter since the reading is still thereon.

The embodiment of the invention which is illustrated in FIG. 5 differs from that described above only in connection with the retarding means. Thus, with the embodiment of FIG. 5 instead of using a brake arrangement, an escapement arrangement is used to retard the return of the tensioning means to its rest position so as to guarantee the light meter pointer sufficient time to assume an angular position which will be accurately indicative of the lighting conditions.

As many be seen from FIG. 5, the same tensioning plate 33 is supported by the housing, and the rack teeth 35 thereof cooperate with the pinion 10. However, the pinion 10 is fixedly connected with a tensioning disc 68 which differs from the tensioning disc 11 in that the disc 68 is provided with teeth 69 at its outer periphery. An anchor escapement 70 cooperates with the teeth 69 of the tensioning disc 68 which is otherwise identical with the tensioning disc 11. This anchor escapement 70 is pivotally carried by a lever 72 which is supported for turning movement by a stationary pivot pin 71 carried by the housing of the exposure meter, and a wire spring 73 is coiled about the pivot pin 71, is fixed at one end to a stationary part of the housing, and presses with its other end against a pin of the lever 72 so as to urge the latter in a counterclockwise direction, as viewed in FIG. 5, so that the spring 73 urges the lever 72 to turn in that direction which will place the anchor escapement 70 in engagement with the teeth 69. The lever 72 includes a projection 74 which is engaged by a projection 75 of the plate 47. When this plate 47 is in the rest position thereof the projection 75 by engagement with the projection 74 will maintain the lever 72 in the position illustrated in FIG. 5 where the anchor escapement 70 is out of engagement with the teeth 69. The spring 52 is sufficiently stronger than the spring 73 to guarantee that when the plate 47 is held in its rest position by the spring 52, the projections 74 and 75 will cooperate to retain the lever 72 in opposition to the spring 73 in the rest position illustrated in FIG. 5.

Thus, when the plate 47 is moved in the direction of the arrow x of FIG. 5 by the operator the tensioning plate 33 will be released to the spring 59 which will return the tensioning means to its rest position in the direction of the arrow w of FIG. 5, and during this time the tensioning disc 68 will turn in a clockwise direction, but since the projection 75 has moved downwardly away from the projection 74 the anchor escapement 70 will cooperate with the teeth 69 to retard the turning of the tensioning disc 68 and thus retard the return of the plate 33 to its rest position.

The release of the gripping means to grip the light meter pointer and then the succeeding release of the indicator disc 12, as described above in connection with FIGS. 1–4, takes place with the embodiment of FIG. 5 after a predetermined period of time which can be regulated according to the construction of the escapement 69, 70.

Thus, it will be seen that with the structure of the invention it is not possible for the operator to cause the light meter pointer to be gripped immediately after release thereof so that it does not have sufficient time to assume an angular position which is accurately indicative of the lighting conditions. Thus, irrespective of how the exposure meter of the invention is operated, the retarding means will guarantee sufficient time for the light meter pointer to assume an angular position accurately indicative of the lighting conditions. This is true even if the release means 47 is actuated immediately after actuation of the tensioning means.

It will be understood that each of the elements described above, or two or more together, may also find a useful application in other types of exposure meters differing from the types described above.

While the invention has been illustrated and described as embodied in exposure meters for use with cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an exposure meter, in combination, support means; a manually movable tensioning plate supported for movement by said support means and said plate having a camming edge; a lever turnably carried by said support means and having a follower end engaging said edge when said plate has been moved by the operator from a rest to an operating position; spring means tensioned by movement of said plate to said operating position thereof and returning said plate to said rest position thereof, said plate during its return to its rest position moving at said camming edge thereof along said follower end of said lever so that the follower end of said lever does not become spaced from said camming edge until said tensioning plate has moved through a predetermined distance back toward its rest position; a manually operable release means cooperating with said plate for retaining the latter in said operating position thereof in opposition to said spring means until said manually operable release means is actuated by the operator to release said plate; a rotary indicator disc carried by said support means; transmission means cooperating with said tensioning plate and disc for turning the latter during movement of said plate to said operating position thereof; a projection fixed to said disc; a pawl turnably carried by said support means and cooperating with said projection for holding said disc in the position to which it is turned by movement of said plate to said operating position thereof; second spring means connected to said disc and tensioned during turning of said disc by movement of said plate to said operating position thereof so that said pawl and projection cooperate to hold said disc in the position to which it is turned in opposition to said second spring means, said pawl being coaxial with said lever; means transmitting turning of said lever to said pawl when said camming edge of said plate moves beyond said follower end of said lever for turning said pawl away from said projection to release said disc only after said plate has moved back toward its rest position through said predetermined distance; a light meter carried by said support means and having a turnable pointer; gripping means movable between pointer-arresting and pointer-releasing positions; and an operative connection between said gripping means and said tensioning means for moving the gripping means to said pointer-releasing position when said follower end engages said camming edge, said gripping means automatically arresting said pointer when said tensioning plate has moved through said predetermined distance back toward its rest position.

2. In an exposure meter, in combination, a light meter having a turnable pointer whose angular position is indicative of the light received by the light meter, said pointer having a free end portion; stationary jaw means and movable jaw means cooperating with each other to hold said pointer at said free end portion thereof when said movable jaw means is adjacent said stationary jaw means in a gripping position and to release said pointer when said movable jaw means is spaced from said stationary jaw means by a distance greater than the thickness of the free end portion of said pointer, each of said jaw means including a pair of parallel plates fixed to and spaced from each other and the plates of said stationary jaw means being substantially in the same planes as the plates of said movable jaw means; a follower pointer extending through the space between each pair of plates and across the path through which the free end portion of the light meter pointer turns, said follower pointer engaging the light meter pointer when the latter is gripped by said jaw means to have the position of said follower pointer determined by the position of said light meter pointer, whereby the follower pointer will engage the light meter pointer between a pair of points thereof which are gripped by the pair of jaw means; manually operable tensioning means operatively connected with said movable jaw means and movable from a rest position to an operating position in which latter position of said tensioning means the movable jaw means releases said pointer; retaining means cooperating with said tensioning means for releasably retaining the latter in said operating position thereof; and manually operable release means cooperating with said retaining means for actuating the latter to release said tensioning means for return movement from said operating to said rest position thereof so that said movable jaw means may return to said gripping position.

3. In an exposure meter, in combination, manually operable tensioning means movable by the operator from a rest position through an intermediate position and to an operating position for tensioning, in said end position thereof, the exposure meter preparatory to taking a reading therefrom; manually operable release means cooperating with said manually operable tensioning means to retain the latter in said operating position thereof until said manually operable release means is actuated by the operator to release said tensioning means; a light meter having a turnable pointer; gripping means movable between pointer-arresting and pointer-releasing positions; an operative connection between said gripping means and said tensioning means for moving said gripping means to said pointer-releasing position when said tensioning means moves from said idle position and reaches said intermediate position, said gripping means automatically arresting said pointer when said tensioning means moves from said operating position and reaches said intermediate position; and retarding means cooperating with said tensioning means to retard the movement thereof back to said rest position after actuation of said release means so that the gripping means remains in said pointer-releasing position while the movement of said tensioning means between said operating and intermediate positions thereof is retarded by said retarding means, said tensioning means including a turnable member and said retarding means including teeth on said turnable member and an anchor escapement cooperating with said teeth.

4. In an exposure meter, in combination, manually operable tensioning means movable by the operator from a rest position through an intermediate position and to an operating position for tensioning, when in said end position thereof, the exposure meter preparatory to taking a reading therefrom; manually operable release means cooperating with said manually operable tensioning means to retain the latter in said operating position thereof until said manually operable release means is actuated by the operator to release said tensioning means; a light meter having a turnable pointer; gripping means movable between pointer-arresting and pointer-releasing positions; an operative connection between said gripping means and said tensioning means for moving said gripping means to said pointer-releasing position when said tensioning means moves from said idle position and reaches said intermediate position, said gripping means automatically arresting said pointer when said tensioning means moves from said operating position and reaches said intermediate position; and retarding means cooperating with said tensioning means to retard the movement thereof back to said rest position after actuation of said release means so that the gripping means remains in said pointer-releasing position while the movement of said tensioning means between said operating and intermediate positions thereof is retarded by said retarding means, said tensioning means including a turnable member and said retarding means including teeth on said turnable member and an anchor escapement cooperating with said teeth, said retarding means including a lever carrying said escapement and turning to move said escapement into and out of engagement with said teeth, a spring acting on said lever to urge the latter to a position maintaining said escapement in engagement with said teeth, said release means having a rest position maintaining said lever in opposition to said spring in a position where the escapement is out of engagement with said teeth, so that upon actuation of said release means said spring and lever will move said escapement into engagement with said teeth.

5. In an exposure meter, in combination, manually operable tensioning means movable by the operator from a rest position through an intermediate position and to an operating position for tensioning, in said operating position thereof, the exposure meter preparatory to taking a reading therefrom; manually operable release means cooperating with said manually operable tensioning means to retain the latter in said operating position thereof until said manually operable release means is actuated by the operator to release said tensioning means; a light meter having a turnable pointer; gripping means movable between pointer-arresting and pointer-releasing positions; an operative connection between said gripping means and said tensioning means for moving said gripping means to said pointer-releasing position when said tensioning means moves from said idle position and reaches said intermediate position, said gripping means automatically arresting said pointer when said tensioning means moves from said operating position and reaches said intermediate position; and retarding means cooperating with said tensioning means to retard the movement thereof back to said rest position after actuation of said release means so that the gripping means remains in said pointer-releasing position while the movement of said tensioning means between said operating and intermediate positions thereof is retarded by said retarding means, said tensioning means including a rotary member and said retarding means including a brake surface fixed to said rotary member to turn therewith and a stationary brake shoe cooperating with said brake for retarding the return movement of said tensioning means.

6. In an exposure meter, in combination, support means; tensioning means for tensioning components of the exposure meter preparatory to operation thereof, said tensioning means being manually operable and being supported by said support means for movement from a rest to an operating position; first spring means tensioned by said tensioning means and urging the latter back to said rest position; catch means cooperating with said tensioning means for releasably maintaining the latter in said operating position in opposition to said first spring means; manually operable release means cooperating with said catch means for moving the same to a position releasing said tensioning means for movement by said first spring means back to said rest position; a galvanometer carried by said support means and having a rotary pointer; gripping means carried by said support means and adapted to grip said pointer so as to maintain the same stationary, said gripping means including at least one fixed first gripping jaw, at least one second gripping jaw defining a pointer-receiving gap with and movable toward and away from said first jaw so as to arrest the pointer when moved toward and to release the pointer when moved away from said first jaw, and a second spring means operating on said second jaw to yieldably maintain the same in pointer-arresting position; cam means carried by said tensioning means for movement therewith and cooperating with said second jaw for moving the same in opposition to said second spring means away from said first jaw so as to release said pointer for movement, said cam means maintaining said second jaw in pointer-releasing position during an initial part of the return movement of said tensioning means from said operating position back to said rest position; and retarding means carried by said support means and cooperating with said tensioning means for retarding the return movement thereof by said first spring means during said initial part of said return movement while said cam means maintains said second jaw in said pointer-releasing position, so that even if said manually operable release means is actuated immediately after said tensioning means has reached said operating position thereof there will be sufficient time for said pointer to assume a position accurately indicating lighting conditions.

References Cited in the file of this patent
UNITED STATES PATENTS

| | | |
|---|---|---|
| 2,119,235 | Kuppenbender | May 31, 1938 |
| 2,868,095 | Gebele | Jan. 13, 1959 |
| 2,925,760 | Broschke | Feb. 23, 1960 |
| 2,930,282 | Herterich | Mar. 29, 1960 |
| 2,978,970 | Fahlenberg | Apr. 11, 1961 |